UNITED STATES PATENT OFFICE.

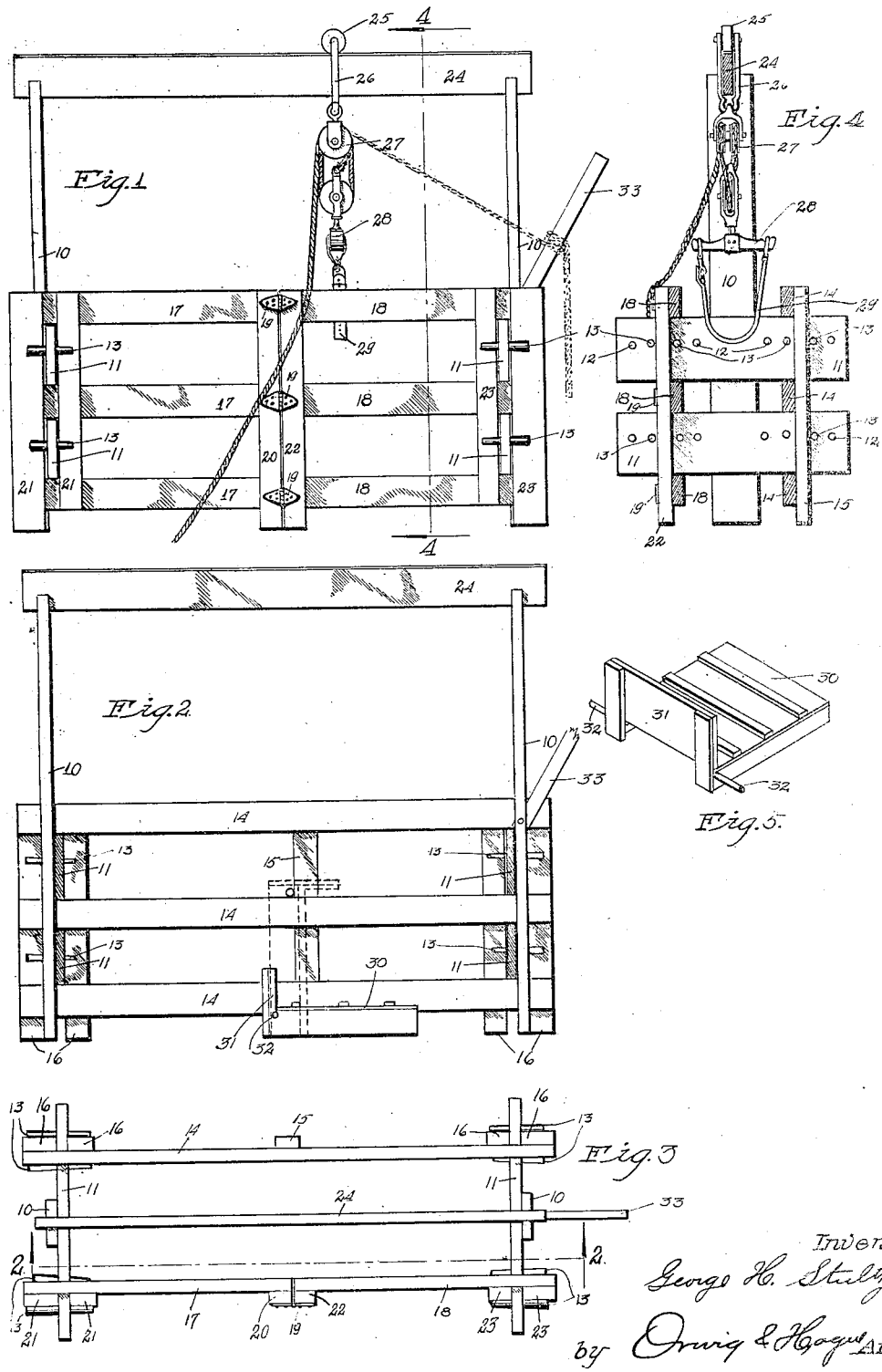

GEORGE H. STULTZ, OF WINTERSET, IOWA.

BREEDING-CRATE.

1,373,921.        Specification of Letters Patent.      Patented Apr. 5, 1921.

Application filed February 14, 1921. Serial No. 444,844.

*To all whom it may concern:*

Be it known that I, GEORGE H. STULTZ, a citizen of the United States, and resident of Winterset, in the county of Madison and State of Iowa, have invented a certain new and useful Breeding-Crate, of which the following is a specification.

The object of my invention is to provide a breeding crate of simple, durable and inexpensive construction, of the class especially designed for use in breeding hogs, and provided with means by which excessively large boars may be raised and their weight partly supported, for the protection of relatively small sows.

More specifically it is my object to provide a crate of this character which may be readily and easily collapsed and folded into a small and compact space when not in use, and readily set up and firmly braced and supported when desired for use, and which may also be adjusted as to width, whereby it may be adapted for use with animals of greatly different sizes.

A further object is to provide simple and inexpensive means for providing a large opening into which both animals may be readily and easily driven, and then when the crate is closed the parts of the crate will be nrmly and securely supported and held against all strains to which such a crate is likely to be subjected.

A further object is to provide an improved combined partition and elevated platform of simple, durable and inexpensive construction, that may readily and easily be placed in position and supported either for use as a partition or an elevated platform.

My invention consists in the construction, arrangement and combination of the various parts of the crate, whereby it may be set up for use or collapsed to fold into a small space readily, quickly and easily, and also in the construction of the device whereby after the entrance gate at the side has been closed, it may be firmly supported on the adjacent end member to thereby form braces and supports for the hinged gate side member and the end member which supports the elevated beam, and also in the construction of the combined partition and elevated platform, and the means by which it may be detachably and firmly supported when used as a partition, and whereby the objects contemplated are attained, as hereinafter more fully set forth, pointed out in my claims, and illustrated in the accompanying drawings, in which:

Figure 1 shows a side elevation of my improved breeding crate in closed position.

Fig. 2 shows a vertical, longitudinal, sectional view, taken on the line 2—2 of Fig. 3, with the rope and pulley device removed. In this figure the combined partition and elevated platform is shown by dotted lines in position for use as a partition.

Fig. 3 shows a top or plan view of the breeding crate with the gate closed and the block and tackle device and the combined partition and elevated platform removed.

Fig. 4 shows a sectional view on the line 4—4 of Fig. 1, illustrating the arrangement of the animal elevating device and also the means for adjustably and detachably connecting the crate end and side members; and Fig. 5 shows a perspective view of the combined partition and elevated platform device.

Referring to the accompanying drawings, I have used the reference numeral 10 to indicate the central uprights of the end members, and 11 the transverse end members which are firmly fixed to the upright 10. These end members 11 are intended to form the ends of the crate.

In each end member there is a series of openings 12, shown in Fig. 4, and I have provided a number of tapered pins or wedges 13 to be placed in said openings. Both of the end members are alike.

There are two side members, one a stationary and one a hinged side. The stationary side member comprises a series of bars 14, a central upright 15, and two uprights 16 at each end, slightly spaced apart far enough to receive the ends of the end members 11 between said uprights 16. All of these uprights 15 and 16 are firmly secured to the bars 14 so that the side member is rigid.

The other side member comprises a stationary frame 17 and a hinged gate member 18 connected to the stationary part 17 by a hinge 19. The stationary side member is provided with an upright 20, and two uprights 21 spaced apart similar to the uprights 16. The hinged member 18 has an upright 22 at one end, and two uprights 23 spaced apart at the other end, similar to the uprights 16. These uprights are so arranged that when the pins 13 are withdrawn the gate member may swing outwardly.

Detachably mounted on top of the upright end members 10 is the supporting beam 24, on which is mounted a roller 25 having a clevis 26, and the said clevis supports a block and tackle device 27. At the lower end of this block and tackle device is a supporting yoke 28, and a belt 29 is connected to said yoke.

The combined partition and elevated platform, as illustrated in Fig. 5, comprises a platform member 30 and an upright end member 31, and at the front end of the platform member 30 is a rod 32 with its ends projecting laterally beyond the sides of the platform. This rod is preferably slidingly mounted, and is long enough to project through the side members of the crate when adjusted to their maximum width apart.

Pivoted to one of the end members is a lever 33, which lever is intended for the purpose of assisting an operator in holding the rope of the block and tackle device when there is an unusually heavy animal suspended in the belt. When this lever is to be used, the animal is first drawn up to its elevated position, and then in order to hold him in that position the rope is wound upon the lever, as shown by dotted lines in Fig. 1, and then the operator may grasp the lever and hold it, which can be done much more easily than by holding the rope alone.

In practical use, and assuming that the parts are in their collapsed position the device may be set up very readily, quickly and easily by simply extending the ends of the horizontal end members 11 through between the uprights 16 of the stationary side member, and then placing the tapered pins 13 through the openings 12 both on the outer and inner sides of the said side members. The same thing is done in connection with the opposite side member having its hinged portion. Then the supporting beam 24, with its pulley and clevis mounted thereon, is detachably mounted in the top of the apparatus 10. If it is desired to adjust the width of the crate, this may be done by removing the pins 13, either on one side of the crate or both, as may be desired, and then moving the side members either inwardly or outwardly, and again reinserting the tapered pins at the desired place.

When the gate 18 is opened a relatively wide opening is provided, through which the sow may be easily driven, and when the sow is in the front end of the pen the partition device may, if necessary, be readily and easily supported in position by first placing it in the position shown by dotted lines in Fig. 2, and then supporting the ends of the rod 32 on the central cross pieces of the side frame members, as shown in Fig. 2.

In the event that the sow is relatively large and the boar is relatively small, no partition is needed, and the combined partition and elevated platform may then be placed in the position shown by solid lines in Fig. 2, resting upon the ground, and thus providing an elevated platform for the boar.

In the event that the boar is relatively heavy, both animals are driven into the crate, the partition placed in position between them, and then the belt 29 is passed under the boar in the rear of his front legs, and the block and pulley device operated to elevate and support his weight.

I claim as my invention:

1. In a crate of the class described, the combination of two crate end members having upper and lower transverse boards, each provided with a series of openings therein, a stationary side crate member having openings therein designed to receive the ends of the boards of said end members, pins detachably mounted in the holes for adjustably securing the side member in position relative to the said end members, a second side member comprising one stationary side member portion and a gate portion, the latter being hinged to the stationary side member portion, and both portions of the latter side member being provided with openings through which the ends of the horizontal boards of the gate end members are extended, and pins for detachably and adjustably securing both the stationary and the hinged side members in position relative to the end members, for the purposes stated.

2. In a crate of the class described, the combination of two crate end members having upper and lower transverse boards, each provided with a series of openings therein, a stationary side crate member having openings therein designed to receive the ends of the boards of said end members, pins detachably mounted in the holes for adjustably securing the side member in position relative to the said end members, a second side member comprising one stationary side member portion and a gate portion, the latter being hinged to the stationary side member portion, and both portions of the latter side member being provided with openings through which the ends of the horizontal boards of the gate end members are extended, and pins for detachably and adjustably securing both the stationary and the hinged side members in position relative to the end members, said pins being tapered for securely locking the parts together.

3. In a breeding crate, the combination of a crate body portion comprising crate end and side members, the latter being provided with a central upright member and also with a central horizontally arranged member, a combined partition and elevated platform comprising a platform member and an upright end member, said device in one position being designed to rest upon the ground to form an elevated platform, and also being designed to be moved to position with the platform in a vertical plane, and means for detachably securing same to the said side members, said means comprising a rod extended through the platform member and designed to rest upon the said horizontally arranged members of the crate sides, and also designed to engage the upright members of the crate sides to prevent sliding movement thereof in one direction.

4. In a breeding crate, the combination of a crate body portion comprising crate end and side members, the latter being provided with a central upright member and also with a central horizontally arranged member, a combined partition and elevated platform comprising a platform member and an upright end member, said device in one position being designed to rest upon the ground to form an elevated platform, and means for detachably securing same to the said side members.

5. An improved breeding crate comprising in combination two end members, each comprising a centrally arranged upright and two transverse end members firmly secured together, the transverse end members being provided with a series of openings in each end, a supporting beam detachably mounted on the tops of said uprights, a roller mounted on said supporting beam, a clevis carried by the roller, a block and tackle connected with the clevis, a yoke connected with the block and tackle, a belt carried by said yoke, two crate side members, each provided with openings to receive the ends of the cross pieces of the end crate members, and tapered pins to be extended through said openings on opposite side members for adjustably and detachably securing the end and side crate members together, one of the side crate members being formed of two parts hinged together at the vertical central portion thereof, so that one member may serve as a gate through which animals may be admitted to the crate, and said parts being so arranged that when the gate is in a closed position and the pins inserted in the proper openings, the end and side crate members will all be firmly supported and held to form a rigid support for the elevated beam and its block and tackle device, substantially as and for the purposes stated.

Des Moines, Iowa, February 8, 1921.

GEORGE H. STULTZ.